United States Patent
Mihira et al.

(10) Patent No.: US 10,412,566 B2
(45) Date of Patent: Sep. 10, 2019

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventors: Yoshiro Mihira, Toride (JP); Takashi Yasuno, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/621,294

(22) Filed: Jun. 13, 2017

(65) Prior Publication Data

US 2017/0289746 A1 Oct. 5, 2017

Related U.S. Application Data

(63) Continuation of application No. 14/739,161, filed on Jun. 15, 2015, now Pat. No. 9,693,177.

(30) Foreign Application Priority Data

Jun. 25, 2014 (JP) .................................. 2014-130688

(51) Int. Cl.
*H04B 5/00* (2006.01)
*H04W 4/80* (2018.01)
(Continued)

(52) U.S. Cl.
CPC ............ *H04W 4/80* (2018.02); *H04W 12/06* (2013.01); *H04W 48/16* (2013.01); *H04W 76/14* (2018.02); *H04W 84/18* (2013.01); *H04W 88/08* (2013.01)

(58) Field of Classification Search
CPC ....... H04W 4/80; H04W 76/14; H04W 12/06; H04W 48/16; H04W 84/18; H04W 88/08
(Continued)

(56) References Cited

U.S. PATENT DOCUMENTS

| 8,805,279 B2 | 8/2014 | Choi et al. |
| 9,020,432 B2 | 4/2015 | Matsushita et al. |

(Continued)

FOREIGN PATENT DOCUMENTS

| CN | 102301353 A | 12/2011 |
| CN | 103298144 A | 9/2013 |

(Continued)

OTHER PUBLICATIONS

Oct. 26, 2015 European Search Report in European Patent Appln. No. 15001644.2.

(Continued)

*Primary Examiner* — April G Gonzales
(74) *Attorney, Agent, or Firm* — Venable LLP

(57) ABSTRACT

There is provided an information processing apparatus and a method of controlling the same. The information processing apparatus performs a device search, displays search results of the device search, and generates tag information to be written into a short range wireless communication tag, using identification information of a device selected by a user based on the displayed search results. Then, the information processing apparatus writes the generated tag information into the short range wireless communication tag with the short range wireless communication.

21 Claims, 13 Drawing Sheets

(51) Int. Cl.
*H04W 12/06* (2009.01)
*H04W 76/14* (2018.01)
*H04W 48/16* (2009.01)
*H04W 88/08* (2009.01)
*H04W 84/18* (2009.01)

(58) Field of Classification Search
USPC .......................................................... 455/41.1
See application file for complete search history.

(56) References Cited

U.S. PATENT DOCUMENTS

| | | | |
|---|---|---|---|
| 9,264,848 B2 | 2/2016 | Choi et al. | |
| 2011/0007901 A1* | 1/2011 | Ikeda | H04B 5/02 380/270 |
| 2011/0312278 A1* | 12/2011 | Matsushita | H04L 12/40013 455/66.1 |
| 2012/0019674 A1* | 1/2012 | Ohnishi | G08C 17/00 348/207.1 |
| 2012/0110515 A1* | 5/2012 | Abramoff | G06F 16/904 715/854 |
| 2012/0208461 A1* | 8/2012 | Choi | H04B 5/0031 455/41.2 |
| 2013/0215467 A1* | 8/2013 | Fein | G06F 3/1204 358/1.15 |
| 2013/0247117 A1* | 9/2013 | Yamada | G08C 17/02 725/93 |
| 2014/0104635 A1* | 4/2014 | Nishikawa | H04N 1/00238 358/1.14 |
| 2014/0313542 A1* | 10/2014 | Benchorin | G06F 3/1292 358/1.15 |
| 2014/0342665 A1* | 11/2014 | Amano | H04W 36/14 455/41.1 |
| 2014/0342666 A1 | 11/2014 | Choi et al. | |
| 2015/0009016 A1 | 1/2015 | Dai | |
| 2015/0038086 A1* | 2/2015 | Kim | G06F 21/35 455/41.3 |
| 2015/0208245 A1* | 7/2015 | Robinton | H04L 9/3247 455/411 |
| 2016/0119032 A1 | 4/2016 | Choi et al. | |

FOREIGN PATENT DOCUMENTS

| | | |
|---|---|---|
| JP | 2013-157736 A | 8/2013 |
| KR | 10-2012-0092366 A | 8/2012 |
| WO | 2013-127124 A1 | 9/2013 |
| WO | 2014-037812 A1 | 3/2014 |

OTHER PUBLICATIONS

Sep. 4, 2017 Chinese Official Action in Chinese Patent Appln. No. 201510349890.1.

* cited by examiner

FIG. 12A

| NFC TAG INFORMATION | VALUE |
|---|---|
| 1. STARTUP APPLICATION INFORMATION | com.example.printapp — 1201 |
| 2. NETWORK CONNECTION INFORMATION | MAC: 1c-3e-fc-4e-45-db — 1202 |
| 3. PRINTING APPARATUS NAME INFORMATION | Printer01 — 1203 |

FIG. 12B

| NFC TAG INFORMATION | VALUE |
|---|---|
| 1. STARTUP APPLICATION INFORMATION | com.example.printapp — 1201 |
| 2. Wi-Fi CONNECTION INFORMATION | SSID: AP-NRT-01<br>Password: ADC1AD099.. — 1204 |
| 3. NETWORK CONNECTION INFORMATION | MAC: 1c-3e-fc-4e-45-db — 1202 |
| 4. PRINTING APPARATUS NAME INFORMATION | Printer01 — 1203 |

FIG. 12C

| | PRINT APP | SCAN APP |
|---|---|---|
| SUBLIMATION TYPE | com.example.sub.printapp | com.example.sub.scanapp |
| LASER | com.example.ls.printapp | com.example.ls.scanapp |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

There is a printing apparatus provided with an NFC (Near Field Communication) tag which records device-identifying information such as connection information (IP address and MAC address) of the printing apparatus. Also, there is a mobile terminal capable of reading contents of the NFC tag and executing an application used to print images and documents. For example, Japanese Patent Laid-Open No. 2013-157736 describes a method in which with an image being displayed by launching an application on such a mobile terminal, information is read from the NFC tag by touching the NFC tag of a printing apparatus with the mobile terminal and the image is printed by the printing apparatus by means of a handover using the information.

As described in Japanese Patent Laid-Open No. 2013-157736, in order to use the NFC tag, it is necessary to write connection information (IP address and MAC address of the printing apparatus) into the NFC tag of the printing apparatus in advance. In so doing, with respect to a portion such as a tag sticker (NFC sticker) which cannot communicate with a controller of the printing apparatus, it is necessary to write necessary information from outside using a writing application or the like. In this case, an input error might occur when a user enters connection information manually, and if connection information containing such an input error has been written into the NFC tag, there is a problem in that printing using the printing apparatus cannot be executed.

SUMMARY OF THE INVENTION

An aspect of the present invention is to eliminate the above-mentioned problems which are found in the conventional technology.

A feature of the present invention is to provide a technique which can prevent a user from inputting wrong information when information used in communication is written into a partner apparatus.

According to a first aspect of the present invention, there is provided an information processing apparatus, comprising: a search unit configured to perform a device search; a display unit configured to display search results of the device search by the search unit; a generation unit configured to generate tag information to be written into a short range wireless communication tag, using identification information of a device selected by a user based on the search results; and a writing unit configured to write the tag information generated by the generation unit into the short range wireless communication tag with a short range wireless communication.

According to a second aspect of the present invention, there is provided a method of controlling an information processing apparatus, comprising: controlling the information processing apparatus so as to perform a device search; displaying search results of the device search; generating tag information to be written into a short range wireless communication tag, using identification information of a device selected by a user based on the search results; and controlling the information processing apparatus so as to write the tag information generated in the generating into the short range wireless communication tag with a short range wireless communication.

Further features of the present invention will become apparent from the following description of embodiments with reference to the attached drawings. Note, in the accompanying drawings, the same reference numerals are added for same or similar configuration elements.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12A is a diagram showing an example of a format for writing into an NFC tag in the embodiments.

FIG. 12B is a diagram showing an example of a format for writing into an NFC tag according to the embodiments.

FIG. 12C is a diagram showing an example of a table in which a correspondence between a printing method and an application is registered.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1A:
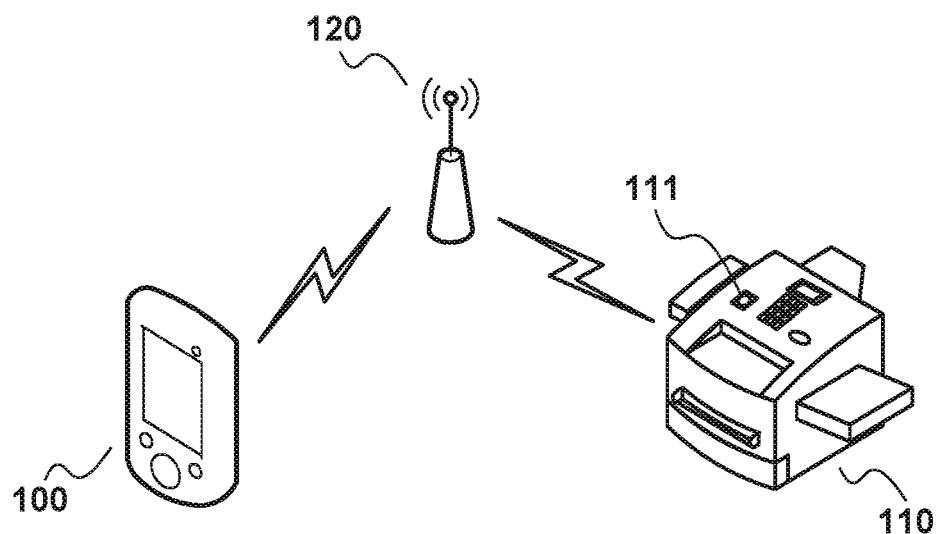
FIG. 1A is a diagram for describing a configuration of a communication system according to a first embodiment of the present invention.

FIG. 1A is a diagram for describing a configuration of a communication system according to a first embodiment of the present invention.

The communication system according to the first embodiment includes a mobile terminal 100 such as a smartphone, a printing apparatus 110, an NFC (Near Field Communication) tag 111, and an access point 120. The printing apparatus 110, which is a multifunction peripheral equipped with, for example, a printing function, scanning function, and fax function, conducts wireless communication such as Wi-Fi with the access point 120. Note that the communication between the access point 120 and printing apparatus 110 is not limited to wireless communication, and may be wire communication using a LAN cable or the like. The mobile terminal 100 is capable of conducting wireless communication such as Wi-Fi. When a user enters an SSID or a security key of the access point 120 into the mobile terminal 100, the mobile terminal 100 is connected to the access point 120 and allowed to communicate with the printing apparatus 110 through the access point 120. Also, the mobile terminal 100 can transmit a print job to the printing apparatus 110 and other apparatus (not shown) connected via the access point 120. When a print job is transmitted to the printing apparatus 110 from the mobile terminal 100, the printing apparatus 110 which receives the print job performs printing according to the print job.

Also, the mobile terminal 100 and printing apparatus 110 can conduct short range wireless communication such as NFC. In the first embodiment, the printing apparatus 110 is equipped with an NFC tag 111 (Near Field Communication tag) which stores connection information (an IP address, MAC address, model name of the printing apparatus 110 or the like) used to connect to the printing apparatus 110. By bringing the mobile terminal 100 close to the NFC tag 111, the mobile terminal 100 can read and obtain the connection information from the NFC tag 111 or write information into the NFC tag 111. In this way, the mobile terminal 100 and other mobile terminals (not shown) can obtain the connection information stored in the NFC tag 111 of the printing apparatus 110 using NFC, and connect to the access point 120 based on the connection information. The switching of connection between the mobile terminal 100 and printing apparatus 110 to wireless communication such as Wi-Fi using information obtained by short range wireless communication such as NFC in this way is referred to as a handover. The handover provides the user of the mobile terminal 100 with the advantage of being able to save the user from entering information (the SSID and security key of the access point 120) used to connect to the access point 120 into the mobile terminal 100.

Figure 1B:
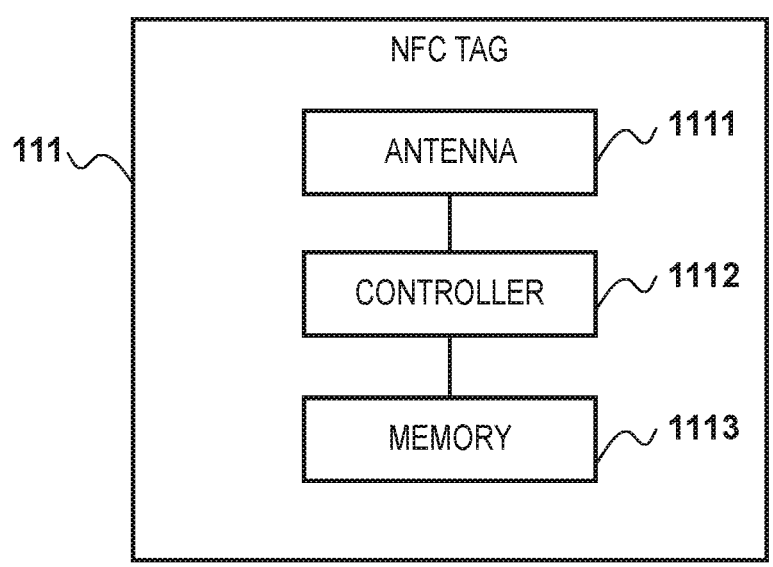
FIG. 1B is a block diagram for describing a hardware configuration of an NFC tag according to the first embodiment.

FIG. 1B is a block diagram for describing a hardware configuration of the NFC tag 111 according to the first embodiment.

An antenna 1111 is connected to a controller 1112. When electric power is supplied to the antenna 1111 from a short range wireless communication unit 208 (FIG. 2A) of the mobile terminal 100 by electromagnetic induction, the electric power is supplied to the controller 1112 as operating power of the controller 1112. Furthermore, in this state, the antenna 1111 operates as an antenna for wireless communication with the short range wireless communication unit 208 of the mobile terminal 100. The controller 1112 communicates with the mobile terminal 100 via the antenna 1111 and reads and writes to a memory 1113 according to read/write commands given via the communication. In this way, information of the printing apparatus 110 including the IP address (described later) is written into the memory 1113, allowing the information to be notified, for example, to the mobile terminal 100 via the antenna 1111 as required.

Figure 2A:
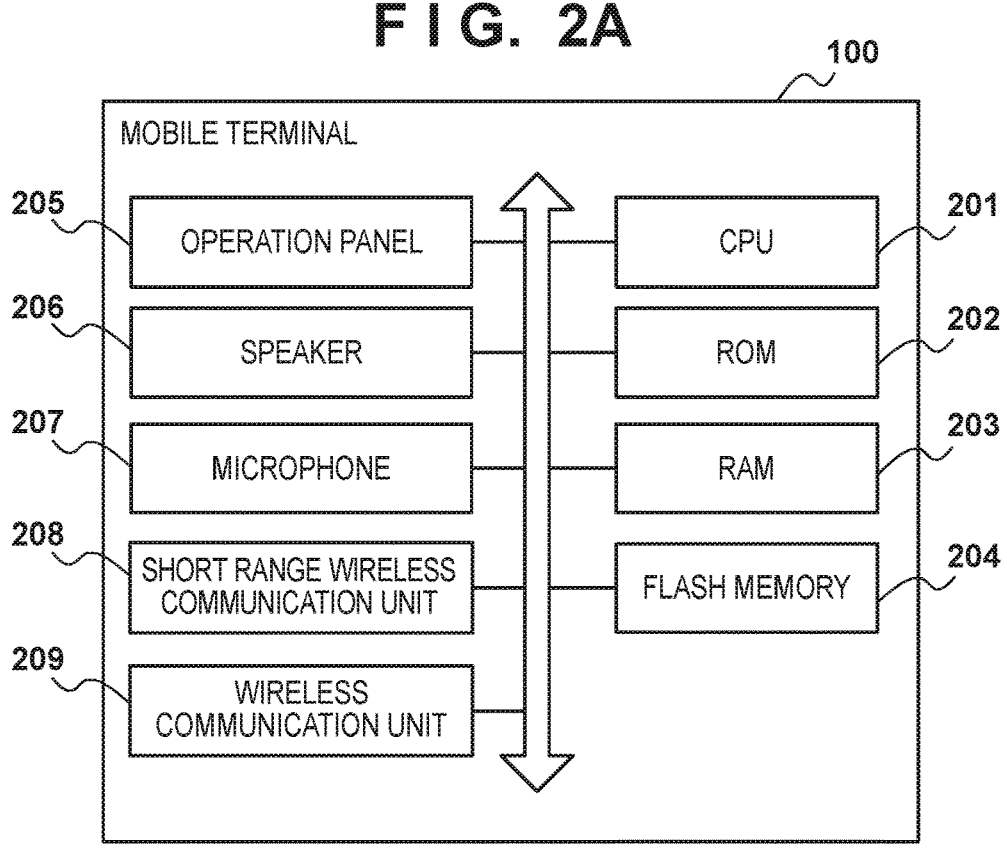
FIG. 2A is a block diagram for describing a hardware configuration of a mobile terminal according to the first embodiment.

FIG. 2A is a block diagram for describing a hardware configuration of the mobile terminal 100 according to the first embodiment. Note that the mobile terminal 100 according to the first embodiment is assumed to be, for example, a smartphone, tablet PC, or the like, but the mobile terminal 100 may be any other information processing apparatus which can conduct wireless communication.

A CPU 201 controls operation of the mobile terminal 100 by executing a program deployed in a RAM 203 from a ROM 202 or flash memory 204. The ROM 202 stores a control program, various setting data, and the like. A RAM 203 is used as a temporary storage area such as a main memory and a work area of the CPU 201. The flash memory 204 is used to store various data including photographs and electronic documents. Besides, the flash memory 204 stores an OS (operating system) and application programs such as an NFC writing application, NFC cooperative print application, and NFC cooperative scan application described later with reference to FIG. 2B. Note that although in the following description, it is assumed that the process of the mobile terminal 100 is accomplished when one CPU 201 executes processing shown in flowcharts described later, another form may be used alternatively. For example, plural CPUs may jointly carry out each step shown in the flowchart described later.

An operation panel 205 has a touch panel function capable of detecting touch actions of the user and displays various screens provided by application programs stored in the flash memory 204. The user can enter a desired operating command by touching the operation panel 205. Note that the mobile terminal 100 is further equipped with hardware keys (not shown), and the user can enter operating commands into the mobile terminal 100 using the hardware keys. A speaker 206 and microphone 207 are used by the user to telephone another mobile terminal or a fixed-line phone. The short range wireless communication unit 208 conducts short range wireless communication such as NFC. In the first embodiment, the printing apparatus 110 is equipped with the NFC tag 111, and when the user brings the mobile terminal 100 close to the NFC tag 111 of the printing apparatus 110, short range wireless communication is established between the short range wireless communication unit 208 and the NFC tag 111 of the printing apparatus 110. With short range wireless communication being established, the short range wireless communication unit 208 can obtain and rewrite information of the NFC tag 111.

A wireless communication unit 209 conducts wireless communication such as Wi-Fi. By transmitting a search packet via the wireless communication unit 209, the mobile terminal 100 can search for and find a printing apparatus capable of communicating via the access point 120. Also, with the mobile terminal 100, the use of handover allows the user to carry out wireless communication via the wireless communication unit 209 by a simple operation. Specifically, using the connection information (SSID and password of the access point 120) obtained from the NFC tag 111 of the printing apparatus 110 by the short range wireless communication unit 208, the wireless communication unit 209 can connect to the access point 120.

Figure 2B:
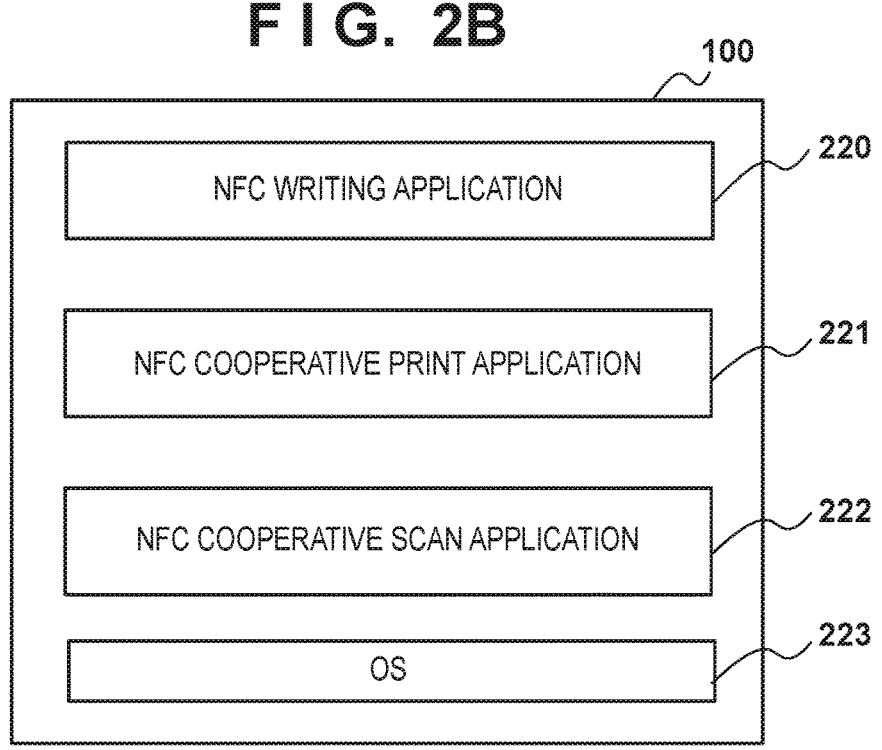
FIG. 2B is a functional block diagram for describing a software configuration of the mobile terminal according to the first embodiment.

FIG. 2B is a functional block diagram for describing a software configuration of the mobile terminal 100 according to the first embodiment. FIG. 2B is a block diagram of software functions implemented when the CPU 201 reads application programs stored in the ROM 202 or flash memory 204.

An OS 223 is an operating system which controls basic operation of the mobile terminal 100. Various application programs can be installed on the mobile terminal 100, including three applications 220 to 222 described later. The OS 223 exchanges information with these application programs, and then according to instructions received from any of these application programs, the OS 223 displays a screen on the operation panel 205 or conducts wireless communication using the wireless communication unit 209.

An NFC writing application 220, which is an application program installed on the mobile terminal 100, can write information needed to communicate with the printing apparatus 110 available via the access point 120 into the NFC tag 111. An NFC cooperative print application 221, which is an application program installed on the mobile terminal 100, performs a printing process by connecting to the printing apparatus 110 using information needed to communicate with the printing apparatus 110 and written into the NFC tag 111. An NFC cooperative scan application 222, which is an application program installed on the mobile terminal 100, can perform a scanning process by connecting to the printing apparatus 110 using the information needed to communicate with the printing apparatus 110 and written into the NFC tag 111. Note that in addition to the application programs described above, various application programs can be installed on the mobile terminal 100, but description thereof will be omitted.

FIGS. 3A to 3D and FIGS. 4A to 4B depict views illustrating examples of transition of screens displayed on the operation panel 205 when the NFC writing application 220 is executed on the mobile terminal 100 according to the first embodiment.

Figure 3A:
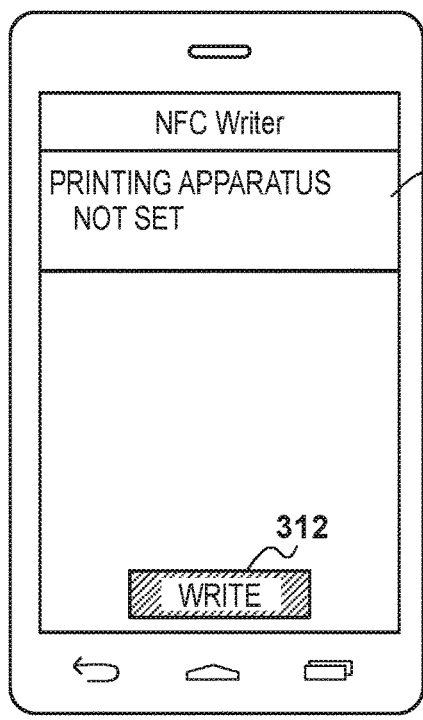
FIGS. 3A to 3D depict views illustrating an example of transition of screens displayed on an operation panel of the mobile terminal according to the first embodiment.

FIG. 3A shows an example of a display brought up on the operation panel 205 when the NFC writing application 220 is launched on the mobile terminal 100. At this time, no printing apparatus is set, and thus a display area 311 indicates that no printing apparatus is set. A Write button 312 is grayed out, indicating that the Write button 312 will not respond even if touched by the user. When the user touches the display area 311 in FIG. 3A, the screen shifts to a screen as shown in FIG. 3B.

Figure 3B:
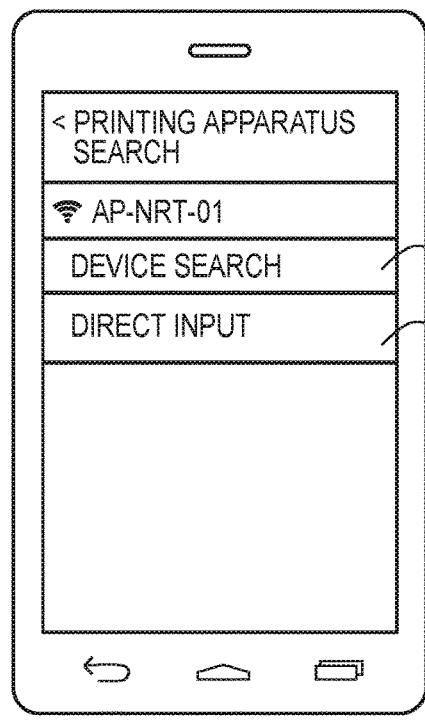
Figure 3C:
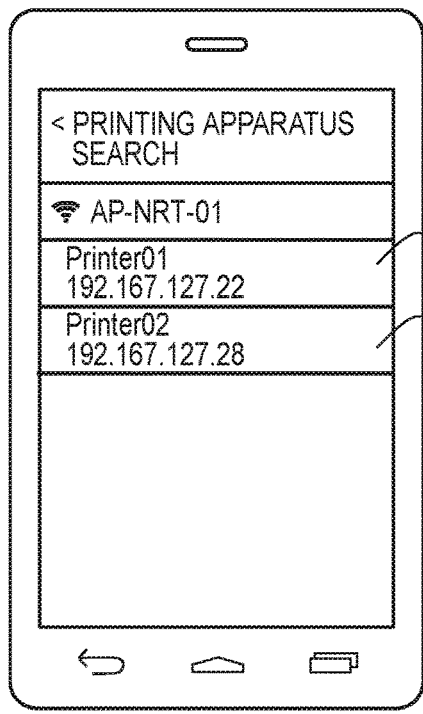

FIG. 3B shows an example of a screen used to specify whether to search for a printing apparatus by a device search or direct input, where the printing apparatus is a partner apparatus for communication. When the user touches a device search area 321, a device search is started and a screen as shown in FIG. 3C is displayed as a result of the device search. In FIG. 3C, two printing apparatuses (Printer01 and Printer02) have been found as a result of the search, and apparatus information about the two printing apparatuses (names and IP addresses of the printing apparatuses) has been obtained and displayed.

Figure 3D:
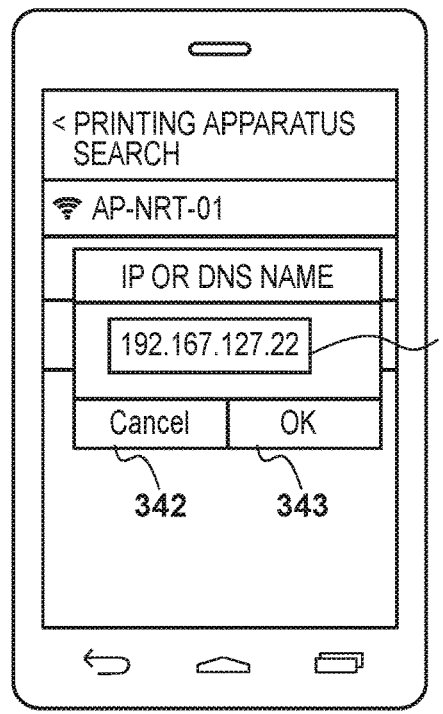

On the other hand, when the user touches a direct input area 322, a screen as shown in FIG. 3D is displayed, allowing the user to enter an IP address or DNS name directly. Note that "AP-NRT-01" is the SSID of the access point 120 connected wirelessly.

FIG. 3C shows an example of search results of a device search. Areas 331 and 332 display information about printing apparatuses found by the device search. In this example, the names and IP addresses of printers are displayed. When the user touches either of the areas 331 and 332 on this screen, information about the printing apparatus to be written into the NFC tag 111 is determined and the screen is transferred to the screen as shown in FIG. 4A.

FIG. 3D shows an example of a screen used to enter an IP address or DNS name directly. Here, the user enters an IP address or DNS name into an input box 341. FIG. 3D shows a state in which an IP address has been entered in the input box 341. Then, when the user touches an OK button 343, the mobile terminal 100 verifies connection to the printing apparatus using the IP address, and obtains the name of the printing apparatus and IP address. Once the name of the printing apparatus and IP address are obtained successfully, the screen of the mobile terminal 100 transfers to the screen as shown in FIG. 4A. If the user touches a Cancel button 342, the mobile terminal 100 erases the screen and the screen of the mobile terminal 100 returns to the screen as shown in FIG. 3B.

Figure 4A:
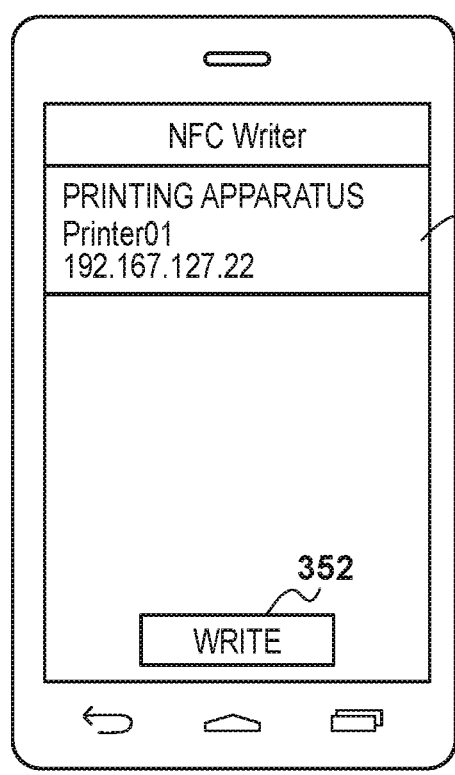
FIGS. 4A and 4B depict views illustrating an example of transition of screens displayed on the operation panel of the mobile terminal according to the first embodiment.
Figure 4B:
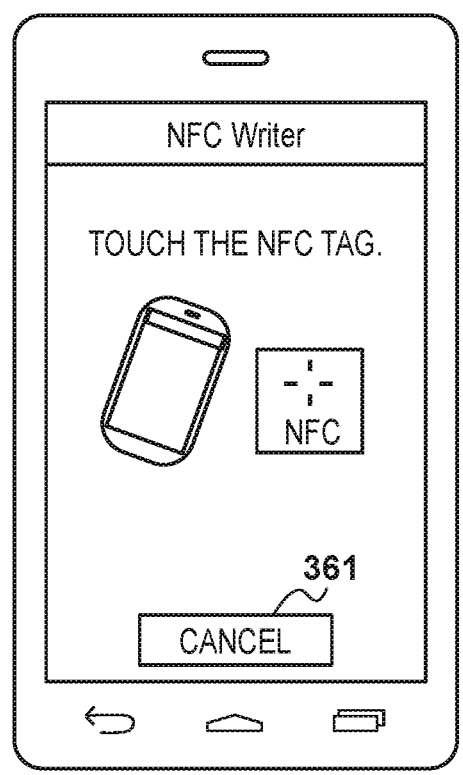

FIG. 4A shows an example of a screen brought up on the operation panel 205 when the user touches the area 331 in FIG. 3C or when the user touches the OK button 343 in FIG. 3D. On this screen, the user confirms the name and the IP address of the printing apparatus displayed in an area 351. Then, when the user touches a Write button 352 on this screen, the screen is transferred to the screen as shown in FIG. 4B. Note that in FIG. 4A, the Write button 352 is displayed in normal, meaning that a user instruction for writing can be accepted.

The screen of FIG. 4B is displayed when the name and the IP address of the printing apparatus confirmed in FIG. 4A are about to be written into the NFC tag 111. In this state, the short range wireless communication unit 208 is ready to write information into the NFC tag 111. Then as the user brings the mobile terminal 100 close to the NFC tag 111 of the printing apparatus 110, the name and IP address of the printing apparatus 110 are written into the NFC tag 111. In this example, the name of the printing apparatus "Printer01", IP address "192.167.127.22", and MAC address are written. Note that a Cancel button 361 is touched by the user to cancel writing into the NFC tag 111.

Figure 5:
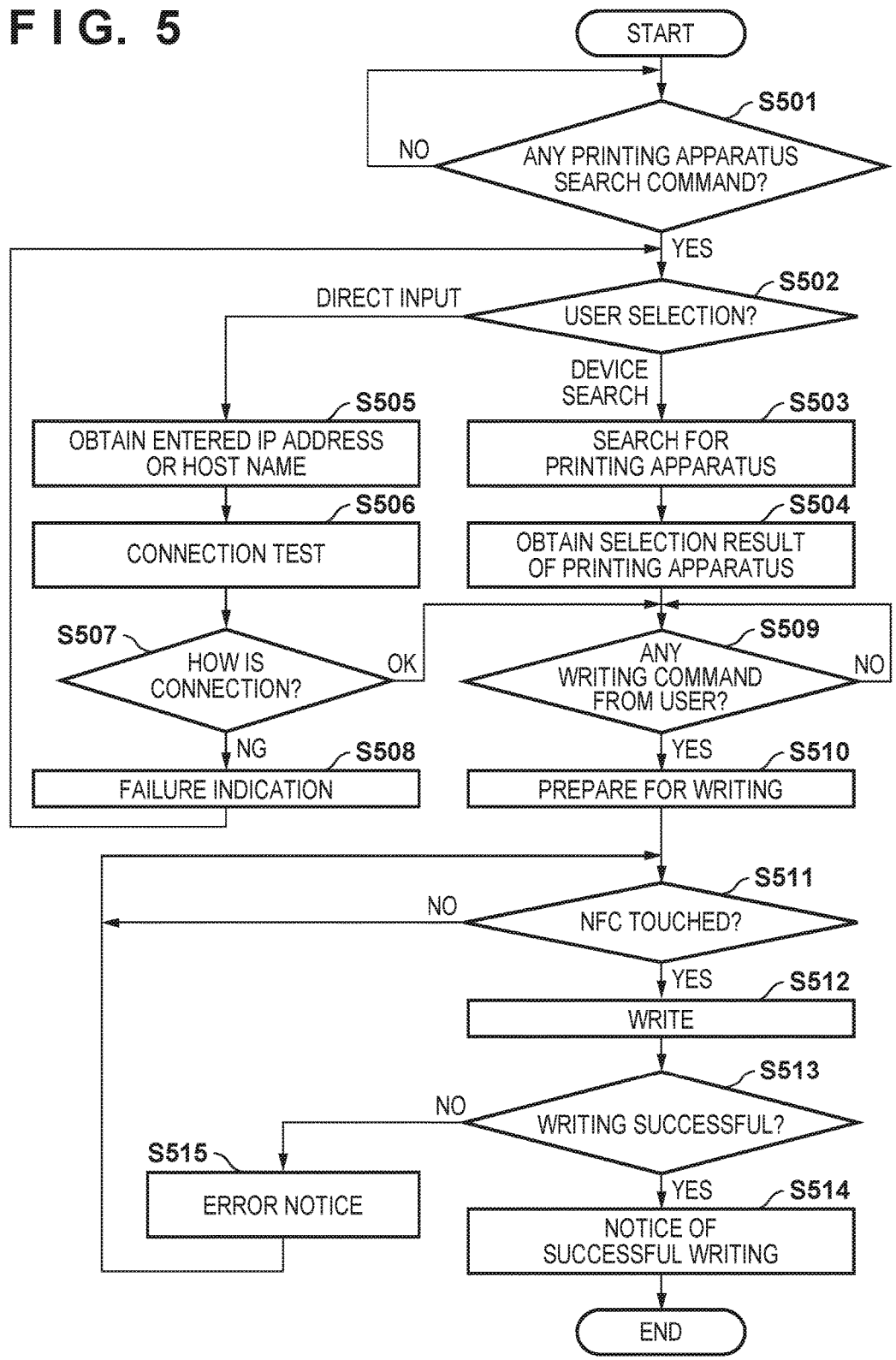
FIG. 5 is a flowchart for describing processing of the mobile terminal for writing into the NFC tag of the printing apparatus in the first embodiment.

FIG. 5 is a flowchart for describing processing of the mobile terminal 100 for writing into the NFC tag 111 of the printing apparatus 110 in the first embodiment. The steps of the flowchart are accomplished when the control program stored in the ROM 202 or flash memory 204 is executed under the control of the CPU 201.

First, the CPU 201 determines in step S501 whether a printing apparatus search command has been issued by the user of the mobile terminal 100. Specifically, the CPU 201 determines whether or not the area 311 of the operation panel 205 is touched in FIG. 3A. If the area 311 is touched, the process advances to step S502 by determining that the printing apparatus search command has been issued, but if the area 311 is not touched, the process returns to step S501. In step S502, the CPU 201 displays the screen as shown in FIG. 3B on the operation panel 205 and waits until the user selects either a device search or direct input. Here, if the user touches the direct input area 322, the process advances to step S505, and if the user touches the device search area 321, the process advances to step S503.

In step S503, the CPU 201 searches for a printing apparatus ready to communicate via the access point 120 and displays results of the search, for example, as shown in FIG. 3C. In the case of the device search, the mobile terminal 100 transmits a packet by broadcasting and establishes an SNMP connection to the IP address of each printing apparatus which has responded to the packet. Then, the CPU 201 obtains existence confirmation and a name of each printing apparatus (Printer01 and Printer02 in the example of FIG. 3C) as well as an IP address and MAC address of each printing apparatus from the responses. Next, in step S504, the CPU 201 obtains the selection result of a printing apparatus selected by the user by touching the area 331 or 332 in FIG. 3C, and then the process advances to step S509.

On the other hand, if the user selects the direct input area 322 in step S502, the process advances to step S505 and displays a screen as shown in FIG. 3D, on the operation panel 205, allowing the user to enter an IP address or DNS name. Then, the CPU 201 obtains the IP address or host name entered by the user on the screen. Next, the process advances to step S506 and conducts a connection confirmation test to test the connection to the IP address or DNS name and thereby determine whether or not the printing apparatus actually exists. Specifically, the CPU 201 establishes an SNMP connection to the entered IP address or DNS name, obtains the existence confirmation of the apparatus as well as the name, IP address, and MAC address of the printing apparatus. Next, the process advances to step S507, where if the name and IP address of the printing apparatus have been obtained as a result of the connection confirmation test in step S506, the process advances to step S509, but if the connection has failed, the CPU 201 notifies the user of the connection failure in step S508 and then returns to step S502.

As a result of the above process, a printing apparatus can be identified by the printing apparatus selection through the device search in steps S503 to S504, or by the direct input in steps S505 to S507. Once the printing apparatus to be connected is identified in this way, the CPU 201 displays a screen as shown in FIG. 4A, on the operation panel 205 in step S509.

In step S509, the CPU 201 determines whether or not the user has touched the Write button 352 of FIG. 4A, entering a command for writing information into the NFC tag 111. Here, if it is determined that a writing command has been entered, the process advances to step S510, but if there is no writing command, the process returns to step S509. In step S510, the CPU 201 performs a preparation process for writing into the NFC tag 111. Specifically, the CPU 201 converts the IP address and the name of the printing apparatus 110 obtained by the device search or direct input into a format of the NFC tag 111 and holds the resulting data in the RAM 203. Then, the CPU 201 switches the display on the operation panel 205 to a screen as shown in FIG. 4B, prompting the user to touch the NFC tag 111 with the mobile terminal 100 to write the information into the NFC tag 111.

FIG. 12A is a diagram showing an example of the data format created in step S510 and used to write information into the NFC tag 111.

Reference numeral 1201 denotes startup application information which describes a name of an application to be launched when the NFC tag 111 is touched by the mobile terminal 100. In this example, the startup application information indicates that an NFC cooperative print application named "com.example.printapp" is launched. Reference numeral 1202 denotes a record of a MAC address which is network connection information. This is the MAC address of a searched printing apparatus. Although only the MAC address is described in FIG. 12A, a combination of information such as the IP address and UUID which can distinguish the printing apparatus 110 may be used instead. Reference numeral 1203 denotes a record for storing a device name. The record stores "Printer01" which is the name of the searched printing apparatus.

Next, in step S511, the CPU 201 determines whether the user has brought the mobile terminal 100 close to the NFC tag 111 and touched the NFC tag 111 with the mobile terminal 100. If the NFC tag 111 has not been touched, the process returns to step S511, but if the NFC tag 111 has been touched, the process advances to step S512. In step S512, the CPU 201 writes the information created in step S510 into the NFC tag 111 via the short range wireless communication unit 208. Then, in step S513, the CPU 201 determines whether or not the writing into the NFC tag 111 has been successful. If it is determined that the writing has been successful, the process advances to step S514 and the CPU 201 notifies the user of the successful writing by voice using, for example, the speaker 206 and/or by a display (not shown) provided on the operation panel 205, indicating the success. After notifying the user in this way that the writing into the NFC tag 111 has been successful, the CPU 201 finishes the process. On the other hand, if it is determined in step S513 that the writing has failed, the process advances to step S515, and the CPU 201 notifies the user that the writing into the NFC tag 111 has failed by voice using, for example, the speaker 206 and/or by a display (not shown) presented on the operation panel 205, indicating the failure. Then, the process returns to step S511.

In the processes described above, since the information written into the NFC tag 111 has undergone the device search in steps S503 to S504 and connection confirmation test in step S506 before the writing, it is possible to prevent wrong information from being written into the NFC tag 111.

Figure 13:
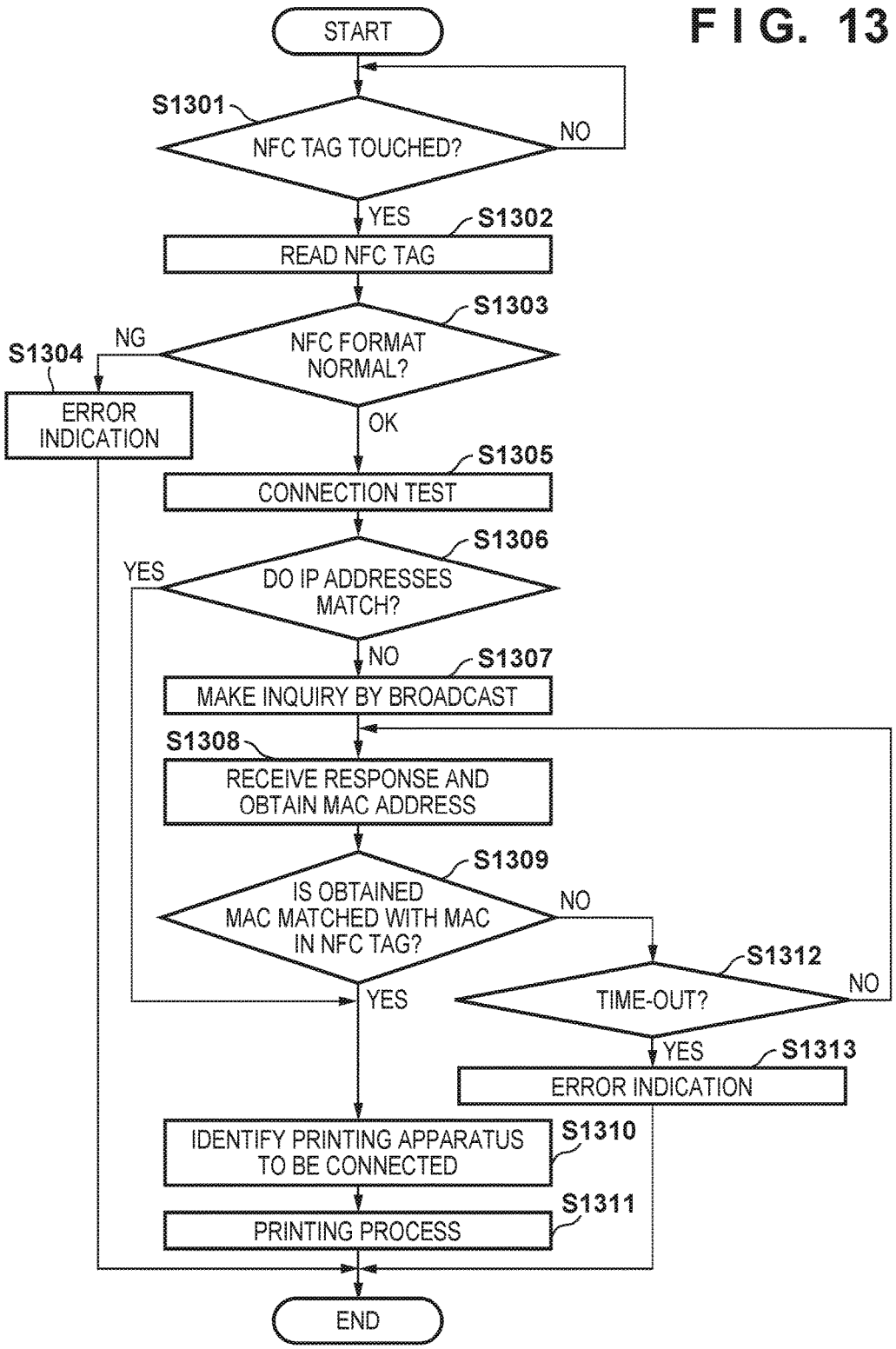
FIG. 13 is a flowchart for describing processing of the mobile terminal according to the first embodiment, in which the mobile terminal reads the NFC tag of a printing apparatus and makes the printing apparatus perform printing.

FIG. 13 is a flowchart for describing processing of the mobile terminal 100 according to the first embodiment, in which the mobile terminal 100 reads the NFC tag 111 of the printing apparatus 110 and makes the printing apparatus 110 perform printing. Note that the steps of the flowchart are accomplished by execution of the control program stored in the ROM 202 or flash memory 204 under the control of the CPU 201.

First, the CPU 201 determines in step S1301 whether the short range wireless communication unit 208 has detected that the user has touched the NFC tag 111 of the printing apparatus 110 with the mobile terminal 100. If it is determined here that the user has touched the NFC tag 111 with the mobile terminal 100, the process advances to step S1302. Otherwise, the CPU 201 carries out step S1301. In step S1302, using the short range wireless communication unit 208, the CPU 201 reads the data recorded in the NFC tag 111. Here, the mobile terminal 100 obtains the IP address and MAC address of the printing apparatus 110 stored in the NFC tag 111. Next, in step S1303, the CPU 201 determines whether or not the format of the data read in step S1302 is normal. If it is determined here that the data written into the NFC tag 111 is incorrect or that the reading of the NFC tag 111 has failed, the process advances to step S1304. In step S1304, the CPU 201 provides an error indication (not shown) on the operation panel 205 and notifies the user of the failure to read the NFC tag 111 and thereby finishes the process.

On the other hand, if it is determined in step S1303 that data has been read from the NFC tag 111 successfully and that the format of the data is normal, the CPU 201 advances the process to step S1305. In step S1305, to check whether the printing apparatus corresponding to the obtained IP address really exists, the CPU 201 causes the wireless communication unit 209 to make an inquiry about the printing apparatus via the access point 120 using a broadcast packet. This is carried out in a manner similar to the process of step S506 in FIG. 5. In step S1306, the CPU 201 determines whether or not the printing apparatus corresponding to the IP address obtained in step S1302 really exists. If it is determined that the printing apparatus corresponding to the IP address exists, the CPU 201 identifies the printing apparatus in step S1310, and then transmits a print job to the IP address of the printing apparatus in step S1311 in order for printing to be done. In this case, the MAC address is not used.

On the other hand, if it is determined in step S1306 that the printing apparatus corresponding to the IP address does not exist, the CPU 201 advances the process to step S1307. Note that the description to the effect that the printing apparatus corresponding to the obtained IP address does not exist assumes, for example, a situation in which the IP address of the printing apparatus has been changed due to changes in a DHCP environment, setting changes made by the user, or the like. In step S1307, to check whether the printing apparatus really exists, the CPU 201 causes the wireless communication unit 209 to make an inquiry about the printing apparatus via the access point 120 using a broadcast packet. Next, in step S1308, the CPU 201 receives a response packet (response) from the printing apparatus via the wireless communication unit 209, inquires of the printing apparatus the MAC address of the printing apparatus using SNMP, and receives a response from the printing apparatus. The response to the inquiry packet contains the MAC address and IP address. Note that although the CPU 201 obtains the MAC address of the printing apparatus via SNMP in step S1308, the CPU 201 may obtain the MAC address by searching a MAC address table (ARP table) of the OS 223.

Next, in step S1309, the CPU 201 compares the MAC address stored in the NFC tag 111 read in step S1302 with the MAC address obtained in step S1308. If the MAC addresses match, the CPU 201 advances the process to step S1310, and if the MAC addresses do not match, the process advances to step S1312 to determine whether or not a time-out has occurred. Note that if the MAC address obtained from the NFC tag does not match the MAC address in the response packet, it is conceivable that the printing apparatus having the NFC tag has been powered off. In step S1310, the CPU 201 identifies the IP address of the printing apparatus which has transmitted the response packet in step S1308 as that of the printing apparatus 110 with the NFC tag 111 attached thereto and sets the IP address as that of the printing apparatus which will carry out printing. Then, in step S1311, the CPU 201 transmits print data to the printing apparatus 110 of the IP address determined in step S1310 and thereby performs a printing process. Specifically, the CPU 201 transmits a file (image data) selected by the user via the operation panel 205 to the printing apparatus 110 having the IP address determined in step S1308, makes the printing apparatus 110 perform printing, and then finishes the process when the printing is finished.

On the other hand, in step S1312, the CPU 201 counts an elapsed time from step S1307 and if a time period equal to or longer than a predetermined time period (e.g., 10 seconds or more) elapses, the CPU 201 advances the process to step S1313 as a time-out. In step S1313, the CPU 201 provides an error indication (not shown) on the operation panel 205, informing the user that the printing apparatus written into the NFC tag 111 was not able to be found and thereby finishes the process. On the other hand, if the CPU 201 determines that the time-out does not occur in step S1312, the process returns to step S1308.

As described above, according to the first embodiment, by writing into the NFC tag of a printing apparatus only when connection to the printing apparatus is confirmed, it is possible to prevent wrong printing apparatus information from being written into the NFC tag. Also, by simply touching the NFC tag with the mobile terminal, a communication connection to the printing apparatus can be set easily and a printing process can be performed easily using the printing apparatus. Note that in the first embodiment, a target printing apparatus is searched for first using the IP address. This is because a shorter time is required for processing than in a case that MAC addresses are compared. Thus, by searching for a printing apparatus first through determination as to whether IP addresses match, it is possible to reduce the time required to transmit a print job and perform printing.

Second Embodiment

Next, a second embodiment of the present invention will be described. The example described above with reference to FIGS. 3A to 3D and FIGS. 4A and 4B in the first embodiment involves searching for a printing apparatus, identifying the printing apparatus, and writing connection information into the NFC tag 111 of the printing apparatus. In the second embodiment, description will be given of an example in which connection information about wireless communication (Wi-Fi) is also written into the NFC tag 111 in addition to the configuration described above. Note that the configuration of the communication system and hardware configuration of the mobile terminal 100 according to the second embodiment are similar to those of the first embodiment described above, and thus description thereof will be omitted.

Description will be given below of a case in which an SSID (Service Set Identifier) and a password are used, where the SSID is set on the access point 120 to identify a destination of wireless communication and the password is similarly set to maintain security.

FIGS. 6A to 6C, FIGS. 7A to 7C, and FIGS. 8A to 8C depict views illustrating examples of transition of screens displayed on the operation panel 205 when the NFC writing application 220 is executed on the mobile terminal 100 according to the second embodiment. Operation of the NFC writing application 220 will be described in detail later with reference to a flowchart of FIG. 9. Note that the writing screen of FIG. 4B in common with the first embodiment is omitted in FIG. 6A to FIG. 8C by so noting.

Figure 6A:
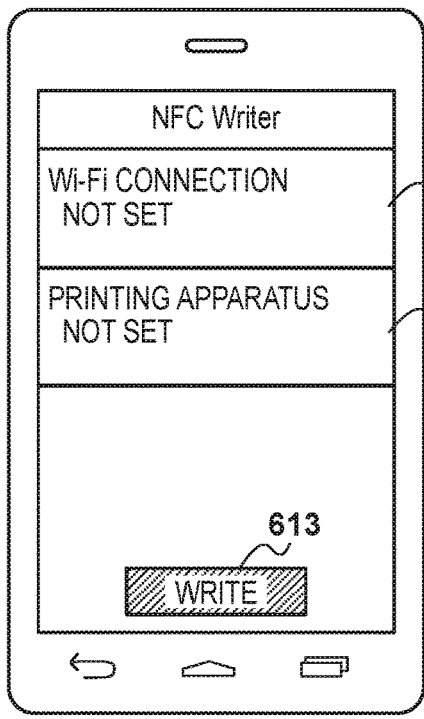
FIGS. 6A to 6C depict views illustrating an example of transition of screens displayed on an operation panel of a mobile terminal according to a second embodiment.

FIG. 6A depicts a view showing an example of a screen displayed on the operation panel 205 when the mobile terminal 100 according to the second embodiment is started.

In FIG. 6A, a Wi-Fi connection display area 611 and a printing apparatus display area 612 are displayed, both are not set. Also, a Write button 613 is grayed out, indicating that the Write button 613 will not respond even if touched by a user. Now, if the user touches the Wi-Fi connection display area 611, the screen shifts to a screen as shown in FIG. 6B.

Figure 6B:
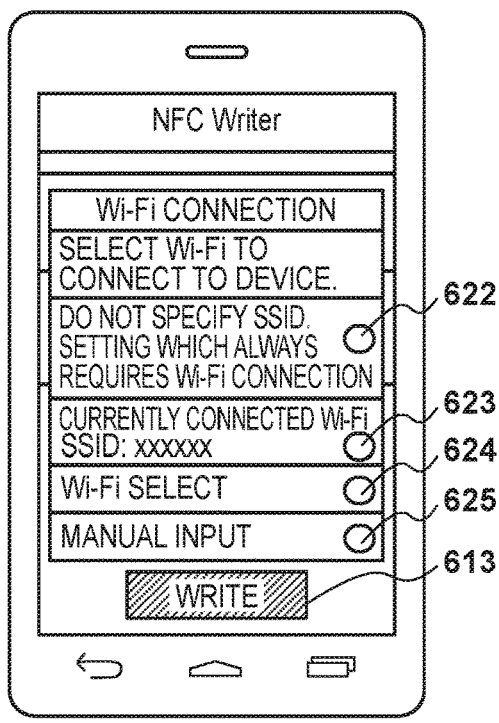

FIG. 6B depicts a view illustrating an example of a screen used to select how to set Wi-Fi connection information.

A button 622 is designated to write NFC tag information shown in FIG. 12A in a manner similar to the first embodiment without specifying an SSID. That is, only the startup application information 1201, network connection information 1202, and printing apparatus name information 1203 are written into the NFC tag. A button 623 is designated to specify the use of an SSID for currently connected wireless communication. A button 624 is designated to display a list of access points currently available for connection and selecting a wireless connection. A button 625 is designated to specify manual input of an SSID by the user.

Figure 6C:
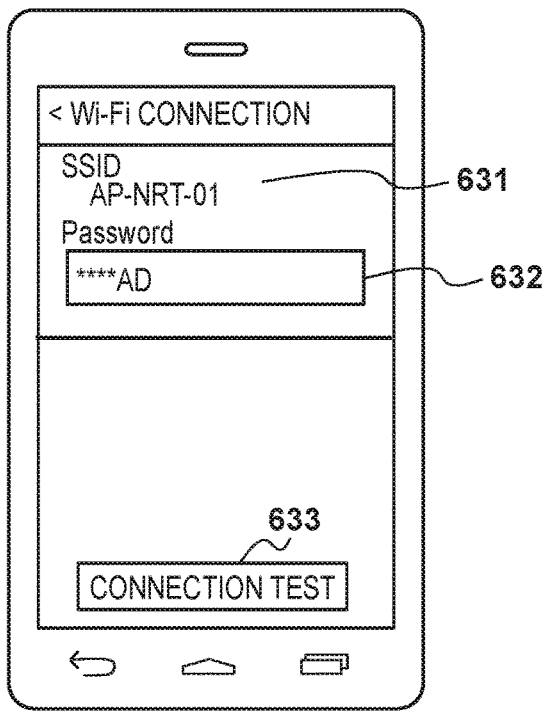
Figure 7A:
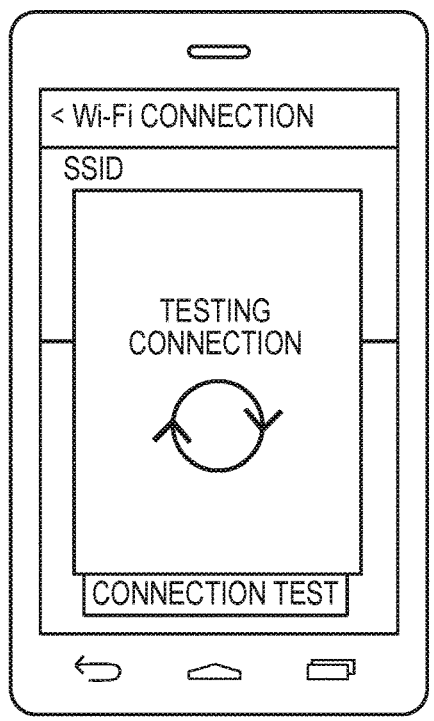
FIGS. 7A to 7C depict views illustrating an example of transition of screens displayed on the operation panel of the mobile terminal according to the second embodiment.

FIG. 6C depicts a view illustrating an example of a screen displayed when the user touches the button 623 on the screen of FIG. 6B. On the screen of FIG. 6C, "AP-NRT-01" which is the SSID of the access point 120 connected currently is displayed automatically in an area 631. FIG. 6C also shows that the user is entering a password in a password input field 632. Here, when the user touches a Connection Test button 633 after entering the password, the screen shifts to the screen as shown in FIG. 7A. Note that although in FIG. 6C, the SSID is obtained from internal information of the mobile terminal 100, the password is entered by the user because password information cannot be obtained for the security.

Figure 7B:
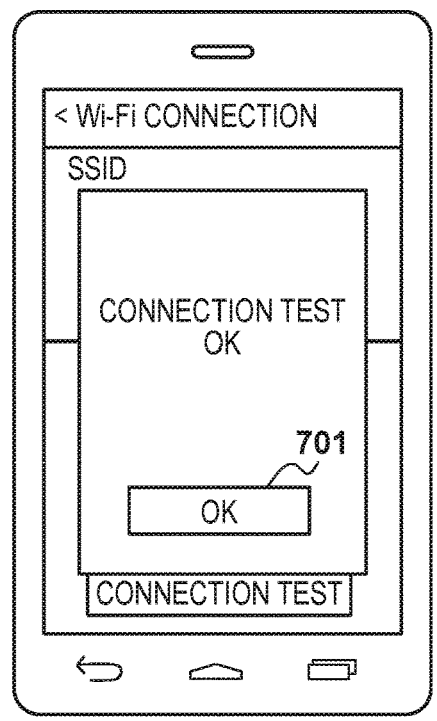

FIG. 7A depicts a view illustrating an example of a connection test screen for wireless communication based on the SSID and password entered on the screen of FIG. 6C. A message and graphics are displayed here, indicating that a connection test is going on. If connection is verified here, the screen shifts to a screen as shown in FIG. 7B. When the user presses an OK button 701 on the screen of FIG. 7B, the screen shifts to the screen of FIG. 7C.

Figure 7C:
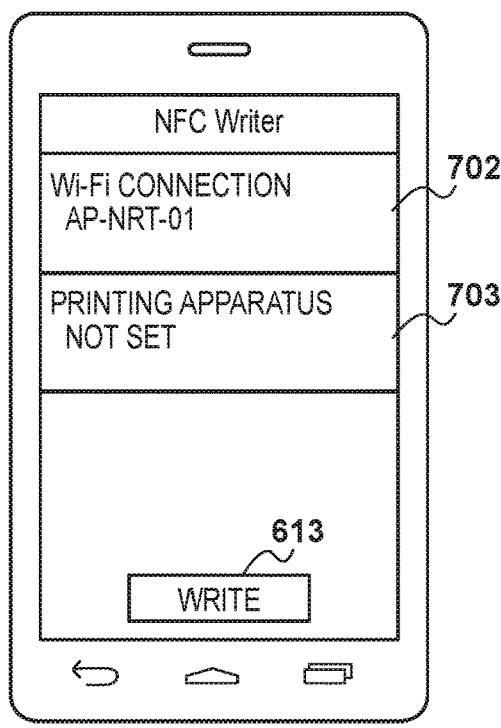

FIG. 7C depicts a view illustrating an example of a state in which establishment of communication has been confirmed by a wireless connection test via the access point 120. Here, an area 702 displays the SSID "AP-NRT-01" of the access point 120 confirmed for communication by the wireless connection test. Note that since a printing apparatus still is not set, an area 703 displays status in which the printing apparatus is not set. Now, when the user touches the area 703, the screen is transferred to the printing apparatus search screen as shown in FIG. 3B described above. Subsequently, a printing apparatus to be used for printing is searched for in a manner similar to the first embodiment described above.

Figure 8A:
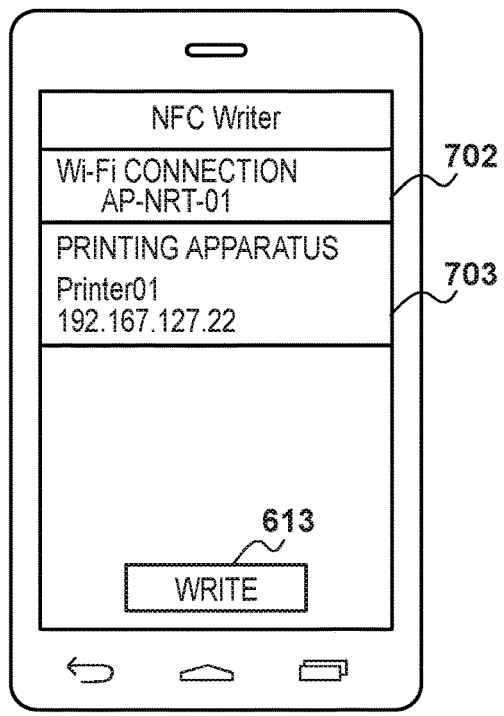
FIGS. 8A to 8C depict views illustrating an example of transition of screens displayed on the operation panel of the mobile terminal according to the second embodiment.

FIG. 8A depicts a view illustrating an example of a screen displayed when the search for a printing apparatus has been finished as a result of operations in FIG. 3B to FIG. 3D. That is, when the user chooses to set a printing apparatus by touching the area 703 on the screen of FIG. 7C, the screen is transferred to the screen as shown in FIG. 3B and allowed to set a printing apparatus in the manner described above with reference to FIGS. 3A to 3D and FIGS. 4A and 4B. Then, if the user touches the Write button 613 on the screen of FIG. 8A, the screen shifts to the writing screen as shown in FIG. 4B to write into the NFC tag 111.

Figure 8B:
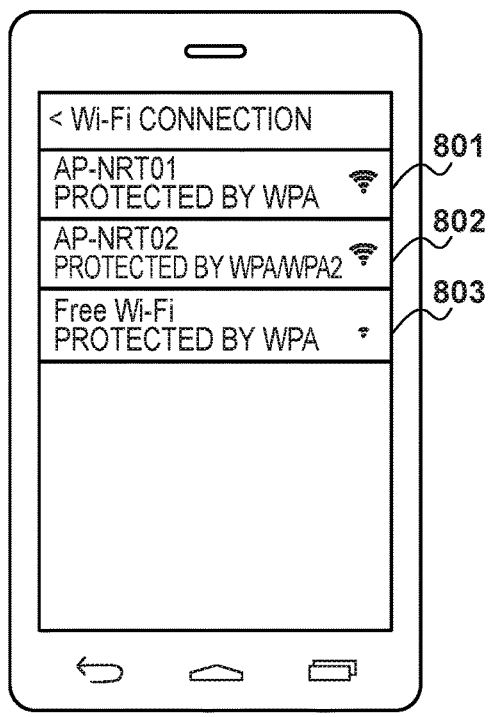

FIG. 8B depicts a view illustrating an example of a screen displaying a list of access points currently available for connection when the user touches the Wi-Fi Select button 624 on the screen of FIG. 6B. Here, when the user selects a desired access point by touching any of areas 801 to 803, the screen is transferred to the screen as shown in FIG. 6C and asked to enter a password.

Figure 8C:
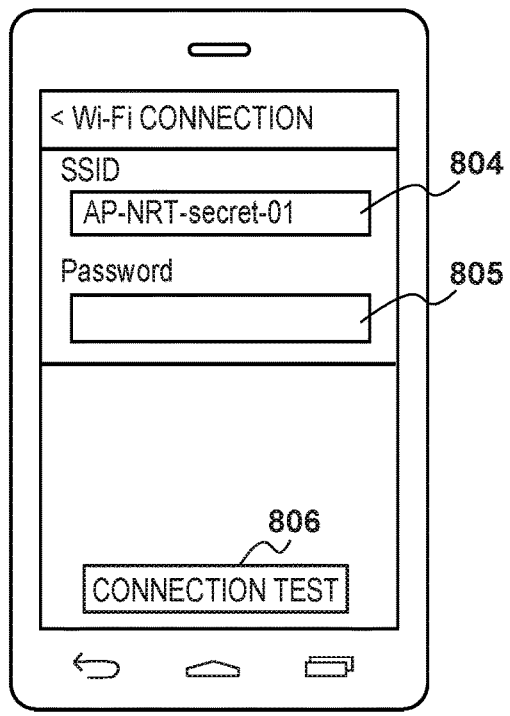

FIG. 8C depicts a view illustrating an example of a screen displayed when the user touches the Manual Input button 625 on the screen of FIG. 6B. Here, the user enters "AP-NRT-secret-01" into an SSID input area 804 and then enters a password into a password input area 805. Then, when the user touches a Connection Test button 806, the screen is transferred to the screen of FIG. 7A and a connection test is carried out as described above.

Figure 9:
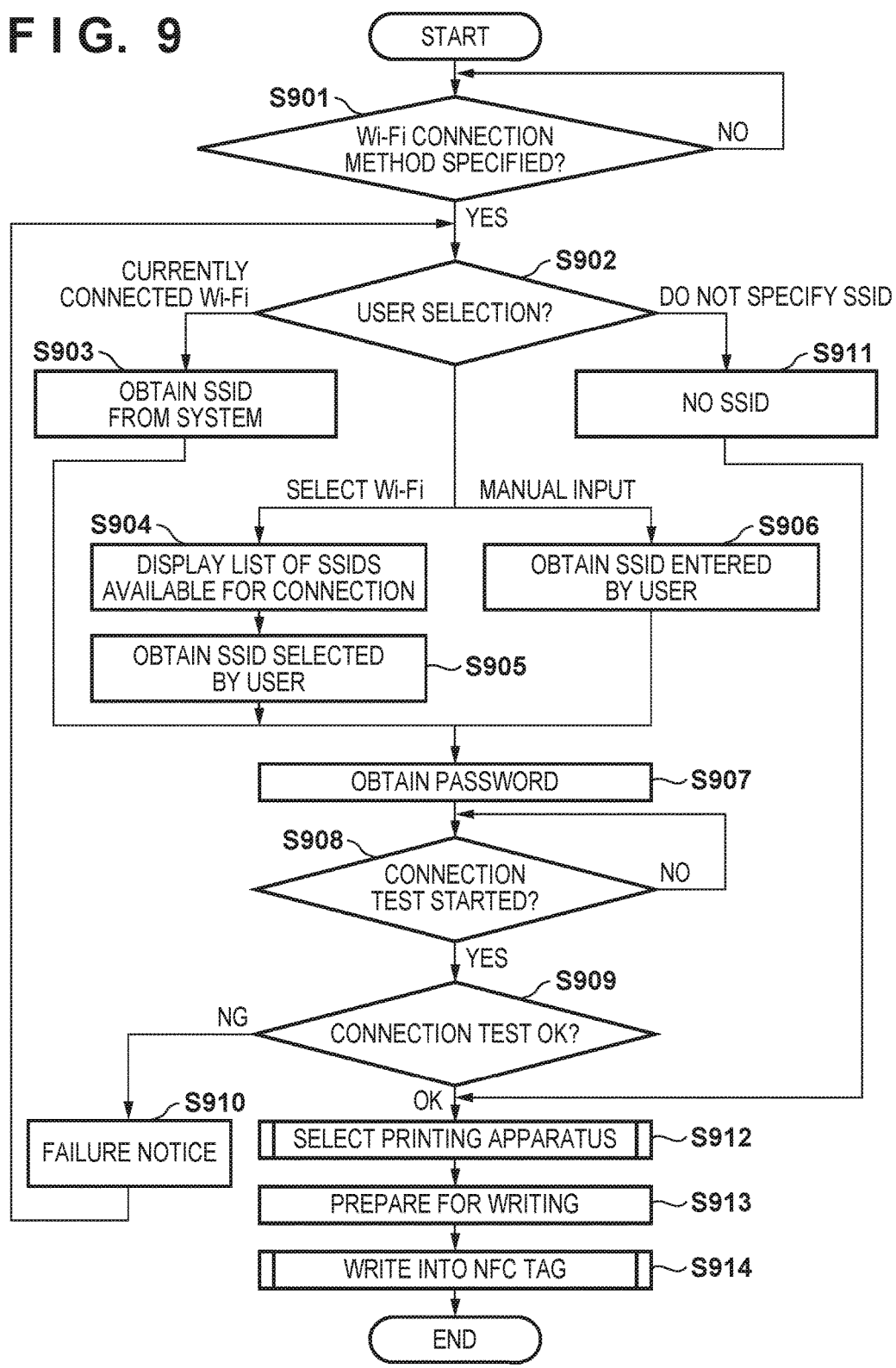
FIG. 9 is a flowchart for describing processing of the mobile terminal according to the second embodiment, in which the mobile terminal searches for a printing apparatus by radio and writes connection information into the NFC tag of the printing apparatus.

FIG. 9 is a flowchart for describing processing of the mobile terminal 100 according to the second embodiment, in which the mobile terminal 100 searches for a printing apparatus by radio and writes connection information into the NFC tag 111 of the printing apparatus 110. The steps of the flowchart are accomplished when the CPU 201 executes the control program stored in the ROM 202 or flash memory 204. This process involves the process of preparing setting information for wireless communication additionally as a process performed before the printing apparatus selection process (steps S502 to S509) and a data writing into the NFC tag (steps S511 to S515) in FIG. 5 described above.

First, in step S901, the CPU 201 waits until the user of the mobile terminal 100 selects how to set Wi-Fi connection information on the screen of FIG. 6A. Specifically, the CPU 201 determines whether or not the user has touched the Wi-Fi connection display area 611 on the screen of FIG. 6A. If the user has touched the Wi-Fi connection display area 611, the CPU 201 advances the process to step S902, but otherwise, the process returns to step S901. In step S902, the CPU 201 displays, for example, the screen as shown in FIG. 6B, and the process branches to an appropriate step according to a selection made by the user of the mobile terminal 100 on the screen of FIG. 6B. If the user touches the button 622 on the screen of FIG. 6B, indicating that the user will not specify an SSID, the process advances to step S911. In step S911, the CPU 201 stores information in the RAM 203, indicating that no SSID will be written, and the process advances to step S912. Then, in step S913, the CPU 201 uses the stored information in preparation for writing. Thus, in this case, NFC tag information which does not contain an SSID is generated.

On the other hand, if the user touches the button 623 for selecting the currently connected Wi-Fi, the CPU 201 advances the process to step S903, obtains the SSID from the currently connected wireless communication unit 209, and then the process advances to step S907.

If the user touches the Wi-Fi Select button 624 in step S902, the CPU 201 advances the process to step S904, and displays a list of access points currently available for connection, for example, as shown in FIG. 8B. In step S904, the CPU 201 displays a list of access points available for connection by obtaining a list of SSIDs currently available for connection from the wireless communication unit 209 so that the user is able to select any one of the displayed SSIDs. Then, in step S905, the CPU 201 obtains the SSID selected by a user operation and advances the process to a password input process in step S907.

If the user touches the Manual Input button 625 in step S902, the CPU 201 advances the process to step S906, displays a screen shown, for example, in FIG. 8C, and obtains the SSID entered by the user manually via the screen, and then the process advances to step S907.

In step S907, the CPU 201 displays, for example, the screen of FIG. 6C or FIG. 8C and obtains the password entered by the user via the screen. Then, in step S908, the CPU 201 waits until the user touches the Connection Test button 633 or 806 of FIG. 6C or FIG. 8C, and if the user touches the Connection Test button, the CPU 201 advances the process to step S909 to carry out a connection test. If the connection is successful as a result, the CPU 201 advances the process to step S912 and enables writing into the NFC tag 111, but if the connection is unsuccessful, the CPU 201 advances the process to step S910 to disable writing into the NFC tag 111 and notify the user of the connection failure, and then the process returns to step S902.

In step S912, the CPU 201 performs a printing apparatus selection process. This process is identical with the process of step S501 to step S509 in FIG. 5 described in the first embodiment. Thus, detailed description will be omitted here. As a result of selecting a printing apparatus in step S912, the CPU 201 stores apparatus information about the selected printing apparatus. Next, in step S913, the CPU 201 performs a preparation process for writing data into the NFC tag 111. Specifically, the SSID setting made in steps S902 to S911 as well as the MAC address (or IP address) and name of the printing apparatus 110 obtained in step S912 are converted into the format (NDEF) of the NFC tag and held in the RAM 203. Then, the CPU 201 switches an operation screen to the writing status screen of FIG. 4B and advances the process to step S914.

Now, the format written into the NFC tag created in step S913 will be described. If it is determined in step S911 not to use any SSID, the same format as that in FIG. 12A of the first embodiment is used. On the other hand, if the user selects any one of the buttons 623 to 625 on the screen of FIG. 6B in step S902, the format shown in FIG. 12B is used.

In FIG. 12B, startup application information 1201, network connection information 1202, and printing apparatus name information 1203 are the same as the respective records in FIG. 12A of the first embodiment described above. Wi-Fi connection information 1204 has been added in FIG. 12B, where the Wi-Fi connection information 1204 includes SSID and password information about the access point 120 ready to be connected to the printing apparatus 110.

In step S914, the CPU 201 writes information into the NFC tag 111. This process is the same as the process of step S511 to step S515 according to the first embodiment. Thus, detailed description will be omitted here. When the process of writing into the NFC tag 111 in step S914 finishes, the writing into the NFC tag 111 is completed.

As described above, according to the second embodiment, writing into the NFC tag 111 is performed only when connection to the access point 120 and connection to the printing apparatus 110 are confirmed. This makes it possible to prevent wrong information from being written into the NFC tag 111, including wrong SSID and password information about the access point 120 and wrong information about the printing apparatus 110. Also, as NFC tag information, connection information including the SSID and password for wireless connection can be recorded.

Third Embodiment

Next, a third embodiment of the present invention will be described. In the second embodiment described above, a printing apparatus is determined on the screen as shown in FIG. 4A according to the first embodiment. In addition, an example has been described in which destination information about a wireless communication network is determined through the operation in FIG. 6B and subsequent operations and written into the NFC tag 111. In the third embodiment, description will be given of a case in which information about a printing method and startup application is also written into the NFC tag 111 in addition to the configuration described above. Note that in the third embodiment, the configuration of the communication system and hardware configuration of the mobile terminal 100 are similar to those of the first embodiment described above, and thus description thereof will be omitted.

The reason why the user is made to select a printing method and startup application is that a compatible application differs depending on whether the printing apparatus is a sublimation type or a laser type and it is, therefore, necessary to change the startup application information 1201 of FIG. 12B written into the NFC tag 111.

FIGS. 10A to 10D depict views showing examples of a screen displayed on the operation panel 205 of the mobile terminal 100 according to the third embodiment. The examples shown here involve the operation of deciding a printing method, an application to be used for printing, and wireless communication connection information, searching for a printing apparatus, and thereby writing into the NFC tag 111. The operation of the NFC writing application will be described in detail later with reference to a flowchart of FIG. 11. Note that setting screens in common with the first or second embodiment described above are omitted in FIGS. 10A to 10D by so noting.

Figure 10A:
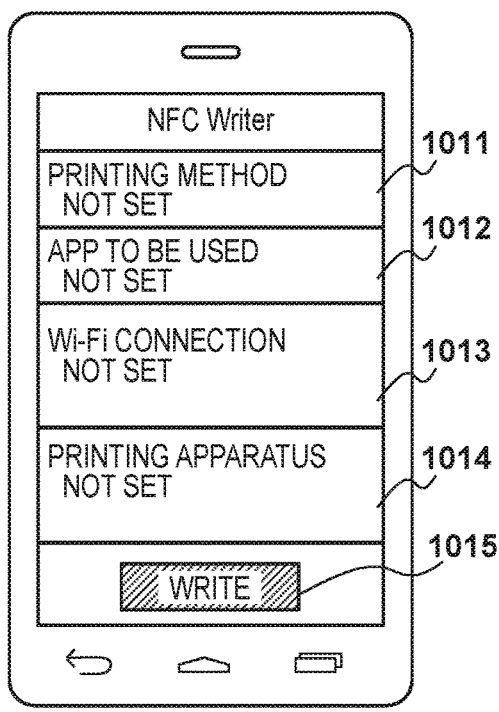
FIGS. 10A to 10D depict views illustrating examples of a screen displayed on an operation panel of a mobile terminal according to a third embodiment.

FIG. 10A shows a view illustrating an example of a screen displayed on the operation panel 205 when the mobile terminal 100 according to the third embodiment is started. None of a Printing Method area 1011, App To Be Used area 1012, Wi-Fi Connection display area 1013, and Printing Apparatus setting area 1014 is set yet. Also, a Write button 1015 is grayed out, indicating that the Write button 1015 will not respond even if touched by the user. Now, if the user touches the Printing Method area 1011, the screen shifts to the screen of FIG. 10B.

Figure 10B:
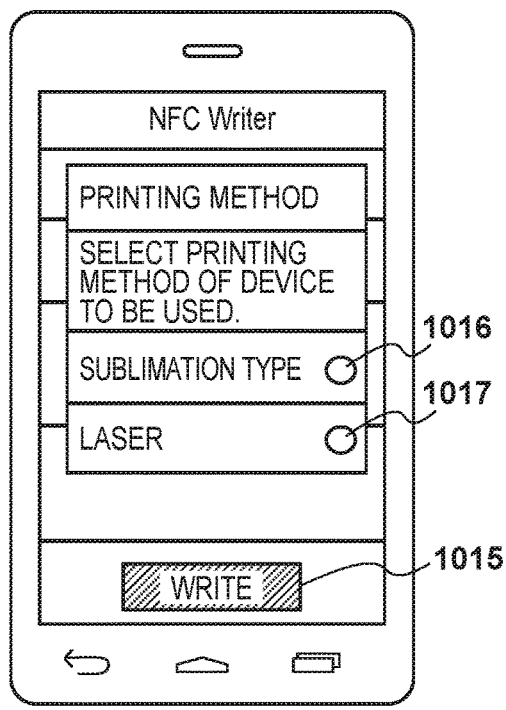

FIG. 10B shows a view illustrating an example of a screen which allows the user to select a printing method. Buttons 1016 and 1017 are used to select a sublimation type and laser type printers, respectively, as printing methods of the printing apparatus 110. Now, if the user touches either of the buttons 1016 and 1017, the screen is transferred to the screen a shown in FIG. 10C.

Figure 10C:
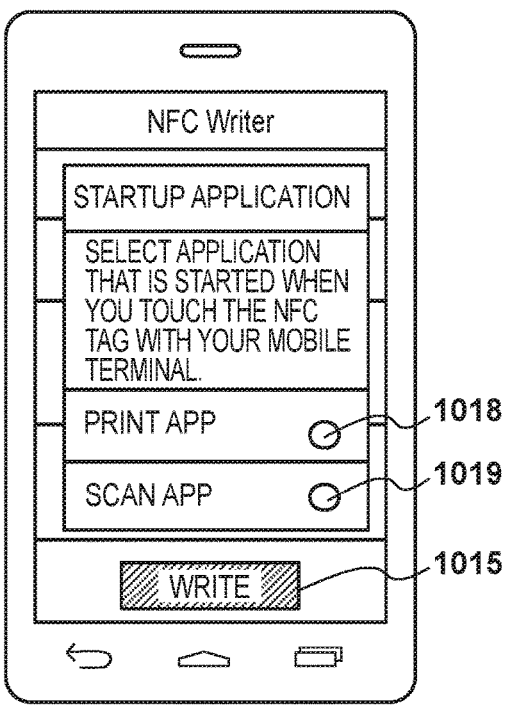

FIG. 10C shows a view illustrating an example of a screen used to select a startup application. Buttons 1018 and 1019 are used to select a print application and scan application, respectively, for the printing apparatus 110. If the user touches either of the buttons 1018 and 1019, the screen shifts to a Wi-Fi connection selection screen of FIG. 6B.

Figure 10D:
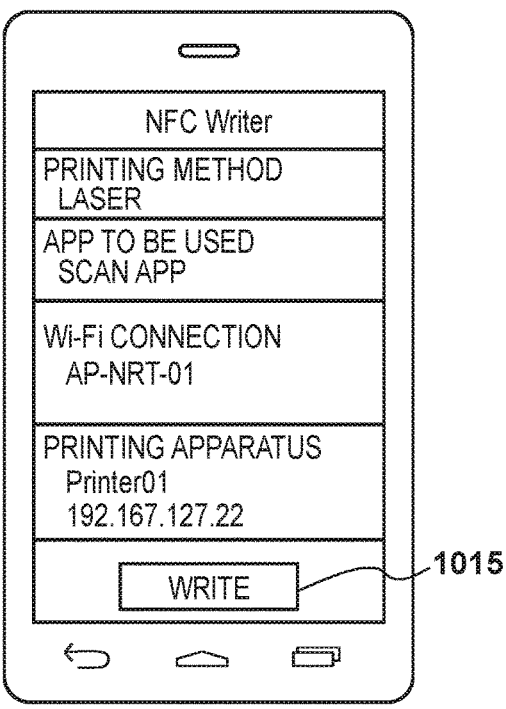

FIG. 10D shows a view illustrating an example of a screen in which a printing method and startup application has been selected in FIGS. 10B to 10C, wireless communication settings are completed by the operations described with reference to FIGS. 6A to 8C, and the search for printing apparatus is finished by the operations of FIGS. 3B to 3D. Now, if the user touches the Write button 1015, the screen is transferred to the writing screen as shown in FIG. 4B.

Figure 11:
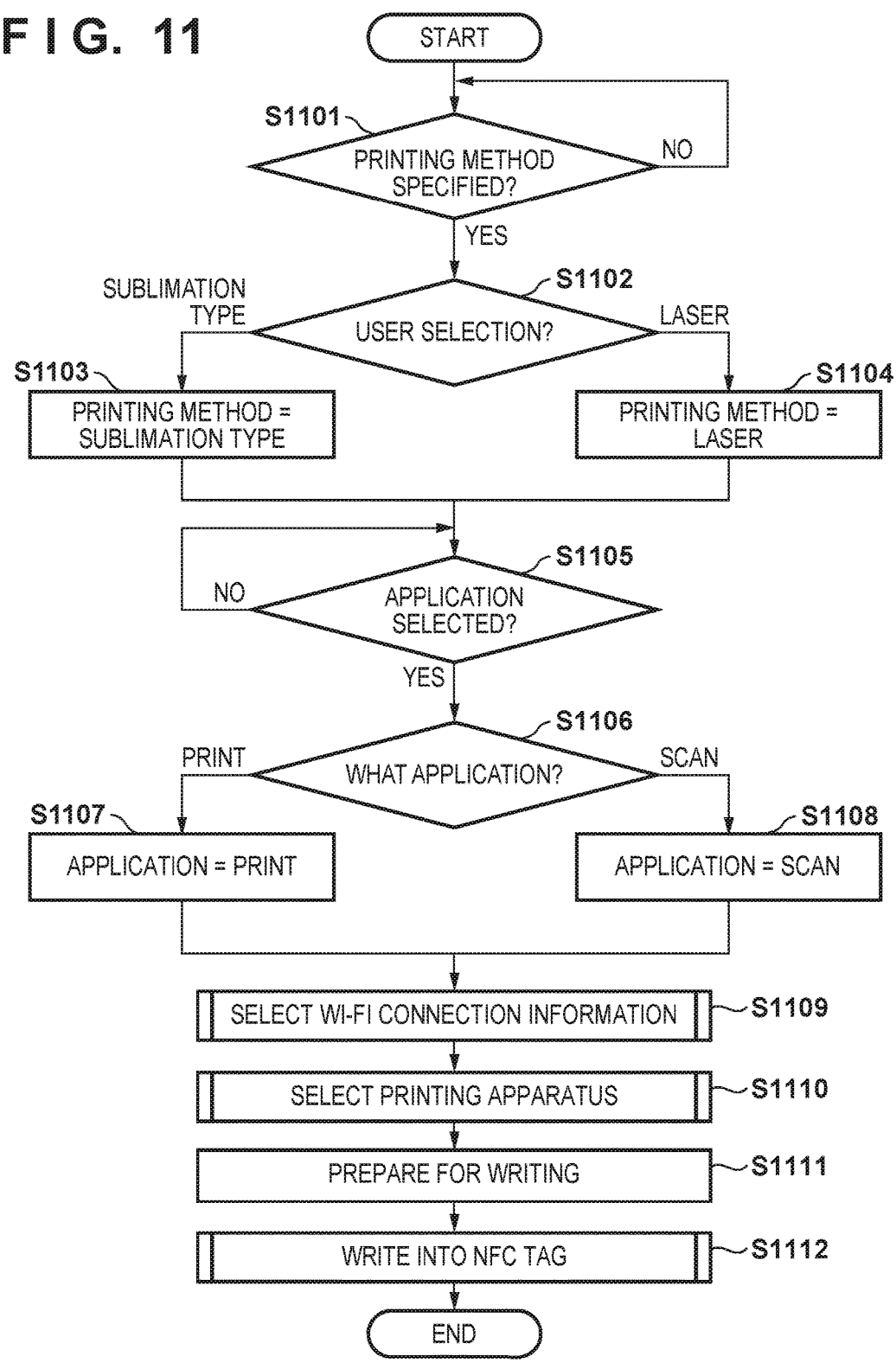
FIG. 11 is a flowchart for describing processing of the mobile terminal according to the third embodiment.

FIG. 11 is a flowchart for describing processing of the mobile terminal 100 according to the third embodiment. This process additionally involves the process of selecting a printing method and startup application as a process performed before the selection of wireless communication settings (steps S901 to S911) in FIG. 9, the selection of a printing apparatus (steps S502 to S509), and writing into the NFC tag (steps S511 to S515) in FIG. 5. The steps of the flowchart are accomplished when the control program stored in the ROM 202 or flash memory 204 is executed under the control of the CPU 201.

First, in step S1101, the CPU 201 determines whether or not the user of the mobile terminal 100 has taken action to select a printing method. Specifically, the CPU 201 determines whether or not the user has touched the Printing Method area 1011 in FIG. 10A. If the user has taken action to select the printing method, the CPU 201 advances the process to step S1102. Otherwise, the process returns to step S1101. In step S1102, the CPU 201 displays, for example, the screen as shown in FIG. 10B and branches the process depending on the button touched by the user of the mobile terminal 100. Here, if the user touches the Sublimation button 1016 in step S1102, the CPU 201 advances the process to step S1103, stores the printing method as Sublimation in the RAM 203, and then the process advances to step S1105. On the other hand, if the user touches the Laser button 1017, the CPU 201 advances the process to step S1104, stores the printing method as Laser in the RAM 203, and then the process advances to step S1105.

In step S1105, the CPU 201 displays, for example, the screen as shown in FIG. 10C and waits until the user of the mobile terminal 100 takes action to select an application. If the user takes action to select an application, the process advances to step S1106 and the CPU 201 determines the application selected by the user. If it is determined in step S1106 that the user has selected the Print App button 1018, the CPU 201 advances the process to step S1107, stores a print application as the startup application in the RAM 203, and then the process advances to step S1109. On the other hand, if it is determined in step S1106 that the user has selected the Scan App button 1019, the CPU 201 advances the process to step S1108, stores a scan application including a print operation as the startup application in the RAM 203, and then the process advances to step S1109.

In step S1109, the CPU 201 performs the process of selecting a Wi-Fi connection information. This process is the same as the process of steps S901 to S911 in FIG. 9 according to the second embodiment described above, and thus description thereof will be omitted here. Next, in step S1110, the CPU 201 performs the process of selecting a printing apparatus. This process is the same as the process of steps S501 to S509 in FIG. 5 according to the first embodiment described above, and thus description thereof will be omitted. Once a printing method and startup application have been selected in steps S1101 to S1108, Wi-Fi connection information is selected in step S1109, and a printing apparatus is selected in step S1110 in this way, preparations for writing into the NFC tag 111 are completed.

In step S1111, the CPU 201 performs a preparation process for writing information into the NFC tag 111. Specifically, the CPU 201 obtains the information about the printing method determined in step S1103 or step S1104 and the startup application determined in step S1107 or S1108. Furthermore, the SSID setting made in steps S902 to S911 and the MAC address (or IP address) and the name of the printing apparatus 110 obtained in step S912 are converted into the format of the NFC tag 111 and held in the RAM 203. Here, the format written into the NFC tag is the same format as that in FIG. 12B of the second embodiment. However, information about the application to be launched changes depending on the printing method and startup application, and thus CPU 201 determines the NFC tag format by determining the starting application name with reference to a table, as shown in FIG. 12C, held in the ROM 202.

In FIG. 12C, startup applications are registered by being associated with a printing method and a print/scan application.

Next, in step S1112, the CPU 201 switches the operation screen to the writing status screen of FIG. 4B, where if the NFC tag 111 of the printing apparatus 110 is touched by the mobile terminal 100, the CPU 201 writes the information prepared in step S1111 into the NFC tag 111. This process is the same as the process of steps S511 to S515 according to the first embodiment, and thus detailed description thereof will be omitted. In this way, the writing into the NFC tag 111 is completed.

As described above, according to the third embodiment, writing into the NFC tag of a printing apparatus is performed only in a case that the printing method of the printing apparatus, startup application, connection to an access point, and connection to the printing apparatus are confirmed. This makes it possible to prevent wrong information from being written into the NFC tag, including a wrong startup application, wrong SSID and wrong password information about the access point, and wrong printing apparatus information.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-130688, filed Jun. 25, 2014, which is hereby incorporated by reference herein in its entirety.

What is claimed is:

1. A method of controlling an information processing apparatus for writing tag data in an NFC (Near Field Communication) tag, the method comprising:

receiving identification information of a printing apparatus from a user;

receiving, from the user, a setting related to an application to be started;

determining whether or not it is possible to connect to the printing apparatus using the received identification information;

generating the tag data that includes data corresponding to the received identification information and data corresponding to the received setting related to the start of the application; and writing the generated tag data in the NFC tag with a short range wireless communication at least in accordance with a determination in the determining step that it is possible to connect to the printing apparatus using the received identification information.

2. The method according to claim 1, further comprising:
displaying a predetermined error notification on a display unit without writing the tag data in the NFC tag, in accordance with a determination in the determining step that it is not possible to connect to the printing apparatus using the received identification information, even if an instruction for writing the tag data in the NFC tag is received from the user.

3. The method according to claim 2, wherein, in the determining step, it is determined that it is possible to connect to the printing apparatus by performing a connection to the IP address using a communication method other than the short range wireless communication to confirm that the printing apparatus exists.

4. The method according to claim 1, wherein the identification information includes at least an IP address of the printing apparatus.

5. The method according to claim 1, wherein, in the determining step, it is determined whether or not it is possible to connect to the printing apparatus by performing a connection confirmation test between the information processing apparatus and the printing apparatus using the received identification information.

6. The method according to claim 1,
wherein the generated tag data is written in the NFC tag in a case where a user operation for instructing to write in the NFC tag is received after receiving the setting and the identification information, and where it is determined in the determining step that it is possible to connect to the printing apparatus using the received identification information.

7. The method according to claim 1, further comprising reading the tag data from the NFC tag with the short range wireless communication.

8. The method according to claim 1, further comprising displaying a notification for prompting the user to touch the NFC tag with the information processing apparatus in accordance with at least having determined that it is possible to connect to the printing apparatus using the identification information and having received an instruction for writing the tag data in the NFC tag from the user.

9. The method according to claim 1, further comprising displaying an error notification in accordance with at least having determined that it is not possible to connect to the printing apparatus using the received identification information and having received an instruction for writing the tag data in the NFC tag from the user.

10. A method of controlling an information processing apparatus for writing tag data in an NFC (Near Field Communication) tag, the method comprising:
receiving identification information of a printing apparatus from a user;
receiving, from the user, a setting for designating whether or not information related to a wireless connection is included in the tag data to be written in the NFC tag;
determining whether or not it is possible to connect to the printing apparatus using the received identification information;
generating the tag data that includes at least data corresponding to the received identification information and data corresponding to an access point for the wireless connection in accordance with that the received setting designates that the information related to the wireless connection is included in the tag data; and
writing the generated tag data in the NFC tag with a short range wireless communication at least in accordance with a determination in the determining step that it is possible to connect to the printing apparatus using the received identification information.

11. A non-transitory computer-readable storage medium storing a program for causing a processor to execute a method of controlling an information processing apparatus for writing tag data in a NFC (Near Field Communication) tag, the method comprising:
receiving identification information of a printing apparatus from a user;
determining whether or not it is possible to connect to the printing apparatus using the received identification information;
generating the tag data that includes data corresponding to the received identification information and data corresponding to the received setting related to the start of the application; and
writing the generated tag data in the NFC tag with a short range wireless communication at least in accordance with a determination in the determining step that it is possible to connect to the printing apparatus using the received identification information.

12. The non-transitory computer-readable storage medium according to claim 11, wherein the method further comprises:
displaying a predetermined error notification on a display unit without writing the tag data in the NFC tag, in accordance with a determination in the determining step that it is not possible to connect to the printing apparatus using the received identification information, even if an instruction for writing the tag data in the NFC tag is received from the user.

13. The non-transitory computer-readable storage medium according to claim 12, wherein, in the determining step, it is determined that it is possible to connect to the printing apparatus by performing a connection to the IP address using a communication method other than the short range wireless communication to confirm that the printing apparatus exists.

14. The non-transitory computer-readable storage medium according to claim 11, wherein the identification information includes at least an IP address of the printing apparatus.

15. The non-transitory computer-readable storage medium according to claim 11, wherein, in the determining step, it is determined whether or not it is possible to connect to the printing apparatus by performing a connection confirmation test between the information processing apparatus and the printing apparatus using the received identification information.

16. The non-transitory computer-readable storage medium according to claim 11, wherein the generated tag data is written in the NFC tag in a case where
a user operation for instructing to write in the NFC tag is received after receiving the setting and the identification information, and where it is determined in the determining step that it is possible to connect to the printing apparatus using the received identification information.

17. The non-transitory computer-readable storage medium according to claim 11, further comprising reading the tag data from the NFC tag with the short range wireless communication.

18. The non-transitory computer-readable storage medium according to claim 11, further comprising displaying a notification for prompting the user to touch the NFC tag with the information processing apparatus in accordance with at least having determined that it is possible to connect to the printing apparatus using the identification information and having received an instruction for writing the tag data in the NFC tag from the user.

19. The non-transitory computer-readable storage medium according to claim 11, further comprising displaying an error notification in accordance with at least having determined that it is not possible to connect to the printing apparatus using the received identification information and having received an instruction for writing the tag data in the NFC tag from the user.

20. The non-transitory computer readable storage medium according to claim 11, wherein the program is an application program capable of installing in the information processing apparatus.

21. A non-transitory computer-readable storage medium storing a program for causing a processor to execute a method of controlling an information processing apparatus for writing tag data in a NFC (Near Field Communication) tag, the method comprising:

receiving identification information of a printing apparatus from a user;

receiving, from the user, a setting for designating whether or not information related to a wireless connection is included in the tag data to be written in the NFC tag;

determining whether or not it is possible to connect to the printing apparatus using the received identification information;

generating the tag data that includes at least data corresponding to the received identification information and data corresponding to an access point for the wireless connection in accordance with that the received setting designates that the information related to the wireless connection is included in the tag data; and writing the generated tag data in the NFC tag with a short range wireless communication at least in accordance with a determination in the determining step that it is possible to connect to the printing apparatus using the received identification information.

* * * * *